Nov. 5, 1940.   S. E. BUCKLEY   2,220,205
METHOD OF LOCATING DETECTABLE CEMENT IN A BOREHOLE
Filed March 31, 1939
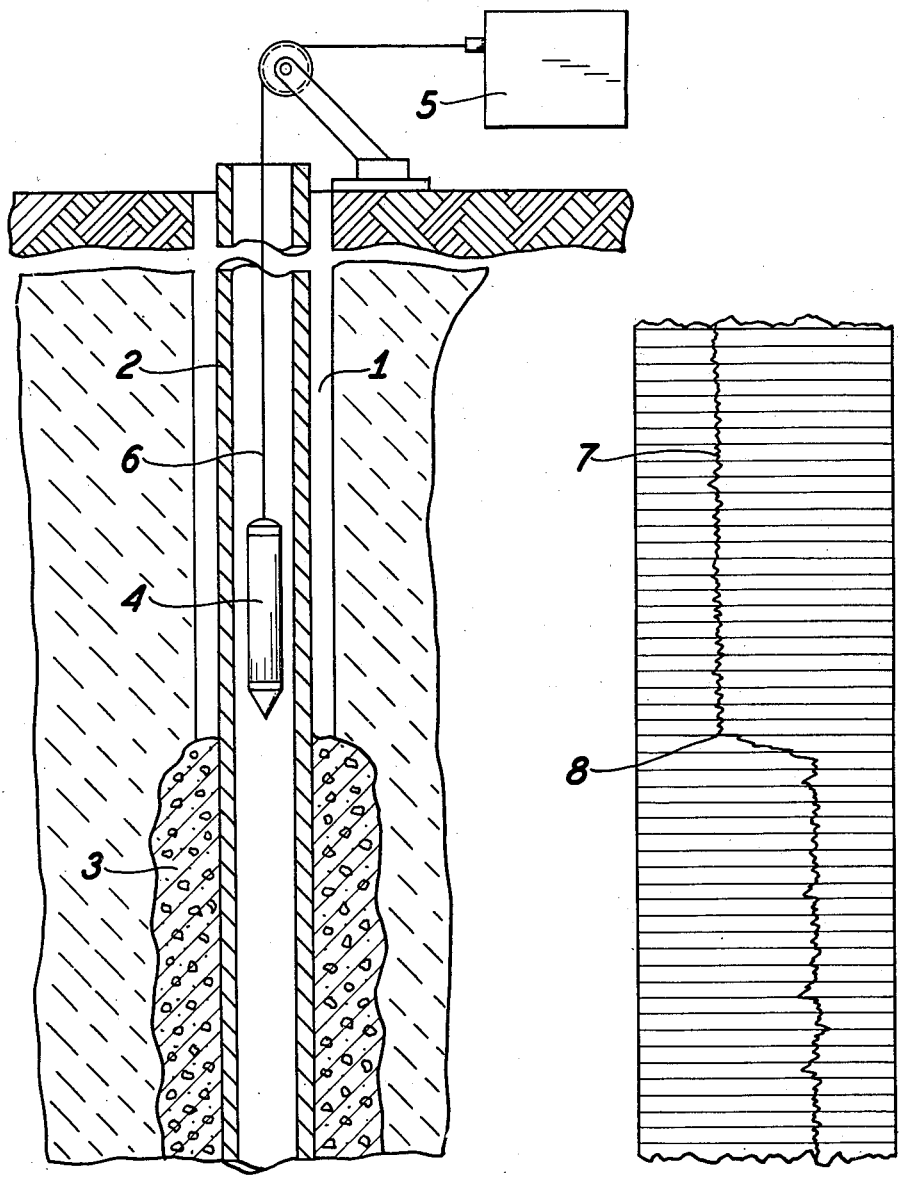
FIG_1_   FIG_2_
INVENTOR.
Stuart E. Buckley
BY
P. L. Young   ATTORNEY.

Patented Nov. 5, 1940

2,220,205

UNITED STATES PATENT OFFICE 2,220,205

METHOD OF LOCATING DETECTABLE CEMENT IN A BOREHOLE

Stuart E. Buckley, Houston, Tex., assignor to Standard Oil Development Company, a corporation of Delaware Application March 31, 1939, Serial No. 265,096

10 Claims. (Cl. 166—21)

The present invention is directed to a method for locating cement in boreholes, particularly behind casing, and to a cement composition adapted to be located by the method of the present invention.

In oil well drilling, a casing is lowered into the completed hole and is cemented in place by forcing cement upwardly from the bottom between the casing and the formation. This cement serves the purpose of preventing oil from the producing formation from going behind the casing and of preventing gas and water from higher formations from getting into the oil from the producing formation. In order to know whether or not higher gas and water formations have been sealed off, it is important to determine how high the cement rose behind the casing. Moreover, in the type of cementing known as a "squeeze job," in which an attempt is made to force cement into a particular formation or between selected formations, it is desirable to ascertain whether or not the cement set in the proper place.

It has hitherto been proposed to determine the position of cement behind the casing by making temperature measurements along the borehole, the top of the cement being indicated by a rise in temperature. This method must be practiced within a limited time after the cement has been injected, since it is only during the setting period that the cement emits heat. On the other hand, one of the times when it is most desirable to find the position of the cement behind the casing is when it is decided to salvage the casing from an old well in which the casing had been set for many years or to perforate the casing of an old well after it has been set for many years so as to attempt the production of oil from a higher formation. In this case, it is extremely important to know the position of cement before the casing is perforated.

According to the present invention, the location of cement behind casing is rendered certain, regardless of the period between the setting of the cement and the making of the measurement, by adding to the cement a radioactive material which is capable of emitting gamma rays. Typical of such materials are the ores which contain uranium, thorium, and actinium, such as pitchblende, carnotite, monazite, tyuyamunite, thorianite, thorite, uraninite, and the like. To determine the position of the cement containing radio-active material it is merely necessary to lower in the casing a gamma ray detector of the type described in co-pending application Serial No. 224,504, filed August 12, 1938, and to observe the record produced. The top of the cement will be indicated by a large deflection on the record.

The radio-active material is added to the cement in powdered form. It may be distributed throughout the cement or it may be employed in the form of a slug. In the latter technique the slug of radio-active material, which may be of any desired size, about 25 pounds being sufficient, is preceded in the casing by a few bags of cement which is used to compensate for the loss resulting from the wiping action of the cement on the formation or, if it is desired to use a larger amount of the radio-active material, such as a slug of a few hundred pounds, the slug can be introduced into the casing first. For "Squeeze jobs" it is, of course, preferable to mix the radio-active material with the cement. For this purpose only a small amount of the radio-active material need be employed, the minimum amount depending upon the sensitivity of the detecting instruments. With the instrument which has thus far been employed for this purpose, it has been found that 200 grams of radio-active material behind the casing at any given point is sufficient to cause a deflection. It is apparent, of course, that more sensitive instruments may be developed. There is no upper limit on the amount of radio-active material which may be employed, except the obvious limit that it cannot be used in such amounts that the cement will no longer function as a sealing medium.

In the accompanying drawing,

Fig. 1 is a diagrammatical representation of an arrangement used for the practice of the present invention, and Fig. 2 is a reproduction of the log obtained by the method of the present invention.

In the drawing, numeral 1 designates a borehole in which is set casing 2, which is cemented in place by cement 3 containing radio-active material. 4 designates an electrode or bomb of the type described in co-pending application Serial No. 224,504, filed August 12, 1938, and entitled Radioactivity well logging, containing elements responsive to gamma rays and connected to a recording device 5 containing suitable batteries at the surface by a cable 6 carrying the necessary conductors. The bomb is lowered through the borehole at any desired rate which may be as high as 50 or 75 feet per minute, and a record is produced at the surface.

As shown in Fig. 2, the recording paper has spaced horizontal lines which designate depths, and the log is a ragged line 7 which is sharply deflected to the right at point 8 which corresponds to the top of the cement. In this case the radio-active material was mixed with all of the cement so that the line 7 did not return to its original value after it passed the top of the cement.

It will be noted that the log above the top of the cement shows no marked deflections. This is because for the practice of the present invention the sensitivity of the gamma ray logging device is adjusted so as not to reflect changes in subsurface formations, but only to detect the radio-active material which, of course, emits much stronger bands of gamma rays than is emitted by any of the natural formations. It may be well to observe at this point that it is for this reason that, preferably, sufficient radio-active material is added to the cement in order to make it detectable by a gamma ray well logger, the sensitivity of which has been decreased. It is to be understood, however, that for the practice of the present invention the gamma ray well logger need not be of reduced sensitivity, since in any case the radio-active material in the cement will produce a greater deflection than any of the natural formations.

The nature and objects of the present invention having been thus described and illustrated, what is claimed as new and useful and is desired to be secured by Letters Patent, is:

1. A method for determining the location of cement in a borehole which comprises adding a radio-active material to the cement, placing the cement in the borehole and then logging the borehole with a device which is sensitive to rays emitted by the radio-active material.

2. A method for cementing oil well casing which comprises preparing a mixture of cement and radio-active material, forcing this mixture behind the casing and then passing through the casing a logging device which is sensitive to rays emitted by radio-active material.

3. A method for cementing casing in boreholes in such a way that the top of the cement behind the casing is determined, which comprises adding to the cement a radio-active material, forcing the mixture behind the casing, allowing the cement to set and then passing through the casing a gamma ray well logging device.

4. A method for cementing casing in boreholes in such a way that the top of the cement is determined which comprises introducing into the casing a slug of radio-active material following this with the necessary quantity of cement to complete the cementing job, forcing the cement behind the casing, allowing the cement to set and then passing through the casing a gamma ray well logging device.

5. The method of cementing casing in boreholes in such a way that the top of cement may subsequently be determined by the use of a well-logging device sensitive to emissions from radio-active material which comprises introducing into the borehole in conjunction with the cement radioactive material in such a way that when the cement is forced behind the casing the top of the cement will contain some of the material, forcing the cement behind the casing and allowing the cement to set.

6. In the production of oil from a subsurface formation through a borehole in which an extraneous material is placed in the borehole and it is desired to determine the position which such material assumes in the borehole, the step of rendering said material radioactive before placing it in position in the borehole whereby its position therein may be determined by passing through the borehole a device which is sensitive to rays emitted by radioactive material.

7. In the production of oil from a subsurface formation through a borehole in which an extraneous material is placed in the bore hole and it is desired to determine the position which such material assumes in the borehole, the steps of rendering said material radioactive, placing the material in the borehole and then passing through the borehole a device which is sensitive to the rays emitted by the radioactive material.

8. A method according to claim 7 in which the extraneous material is rendered radioactive by the addition thereto of a radioactive substance.

9. A method for determining the location of cement in a borehole which comprises rendering the cement radioactive, placing the cement in the borehole and then logging the borehole with a device which is sensitive to rays emitted by radioactive material.

10. A method for cementing casing in a borehole in such a way that the top of cement behind the casing is detected which comprises adding to the cement a radioactive material, forcing the mixture behind the casing and then passing through the casing a gamma ray well-logging device.

STUART E. BUCKLEY.